June 29, 1965 L. W. GILBERT 3,191,205
MACHINE TOOL WITH FEED RATE CONTROL
Filed Feb. 28, 1962 2 Sheets-Sheet 1
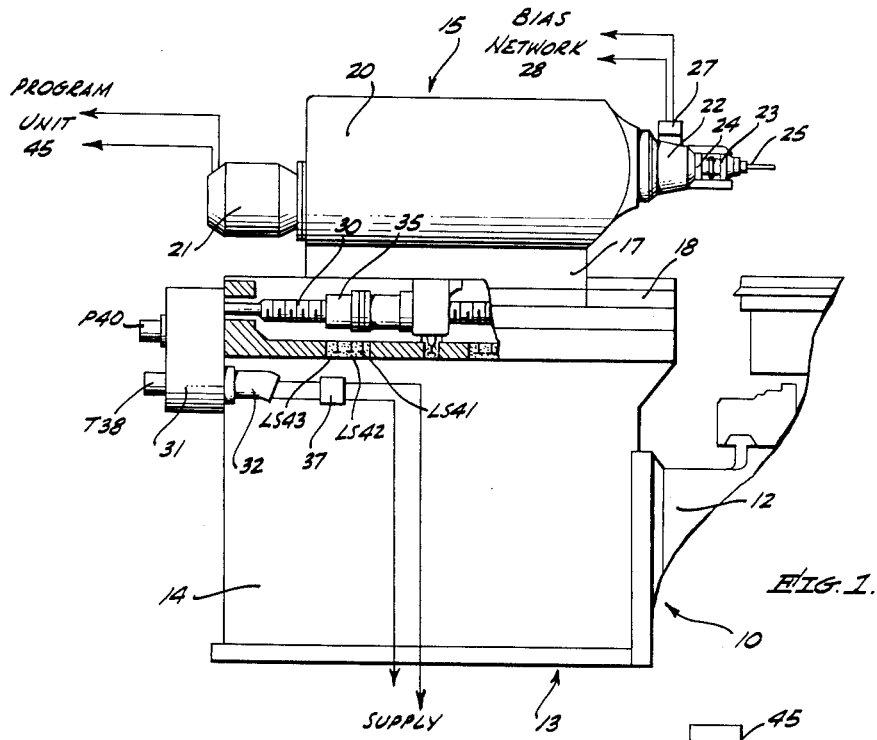
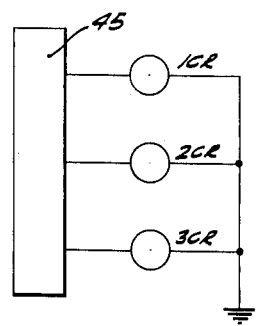
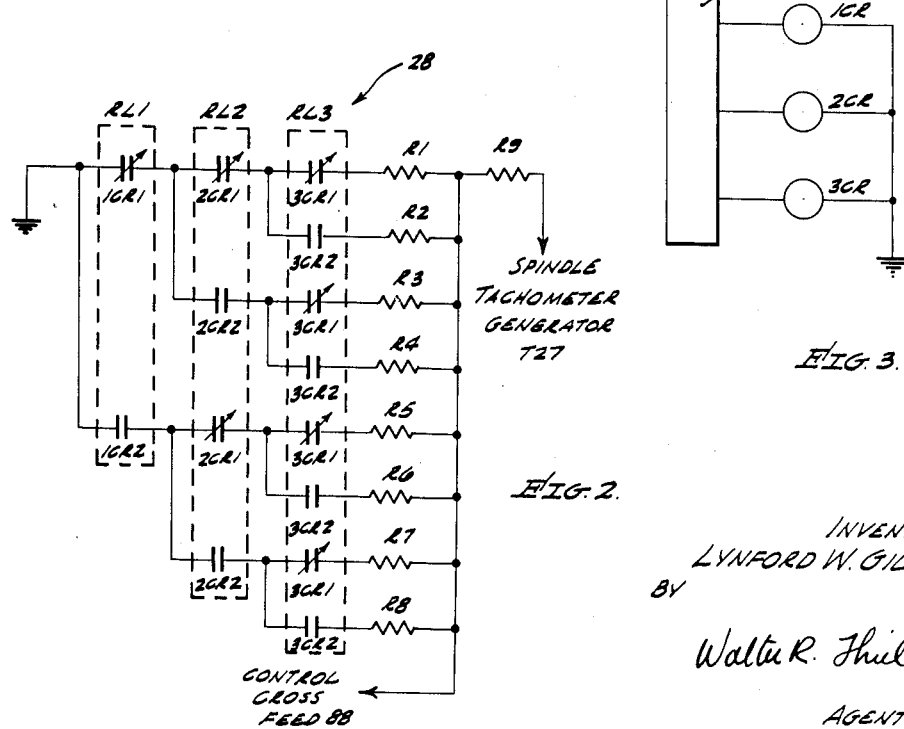
INVENTOR.
LYNFORD W. GILBERT,
BY
Walter R. Thiel
AGENT.

United States Patent Office 3,191,205
Patented June 29, 1965

3,191,205
MACHINE TOOL WITH FEED RATE CONTROL
Lynford W. Gilbert, Palos Verdes Estates, Calif., assignor to Hughes Aircraft Company, Culver City, Calif., a corporation of Delaware
Filed Feb. 28, 1962, Ser. No. 176,348
1 Claim. (Cl. 10—139)

This invention relates generally to machine tools and more particularly to automatic machine tools having facilities to control the feed rate of the tool carriage as a function of the rate of rotation of the tool spindle.

For the purpose of this discussion the machine tools of particular concern are of the numerically controlled type in which instructions for the performing of a particular operation are contained in discrete form on a suitable type of record means such as a tape or a card.

One such machine is disclosed in copending application, Serial No. 135,936, by W. C. Leone, et al., filed September 5, 1961, entitled "Machine Tool" and assigned to the assignee of this invention. Briefly, here a conventional program unit applies its discrete outputs to a suitable storage device or register. The number of output circuits of the register will be determined by the magnitude of the number of different tool assembly feed rates that are desired for different operations of the machine. In this fashion the feed rate of the machine tool is determined solely by the programming of the speed by the program unit.

One object of this invention is to provide a machine tool having facilities to more accurately control feed rate.

Another object is to provide a machine tool which controls feed rate as a function of rate of rotation of the tool spindle.

A further object of this invention is to provide a numerically controlled machine tool with facilities to control feed rate independently of the program unit.

The aforesaid and other objects and advantages are accomplished according to the present invention in a machine tool arrangement providing a workpiece table and a tool carriage assembly movable relative to said table. A spindle drive means and a tool spindle rotatable by the drive means are both mounted on the tool carriage assembly. The spindle drive means has a source of energy connected to it, which is programmed by a program unit for different modes of operation of the machine tool. To generate a voltage directly related to the rate of rotation of the tool spindle, a voltage generating means is provided. The voltage generating means includes a tachometer generator coupled to the tool spindle and a biasing network connected to the output of the tachometer generator. A tool carriage assembly drive means is connected to the output side of the bias network and is mounted on the tool carriage assembly for movement therewith.

Other objects and advantages will become apparent from a study of the following specification when considered in conjunction with the accompanying drawings, in which:

FIGURE 1 is a partially cut-away elevational view of a typical machine tool system embodying the principles of the present invention;

FIGURE 2 is a schematic of a typical attenuator included in the bias network of the present invention;

FIGURE 3 is a block diagram of the program unit and relay coils of the typical attenuator of FIGURE 2.

Figure 4:
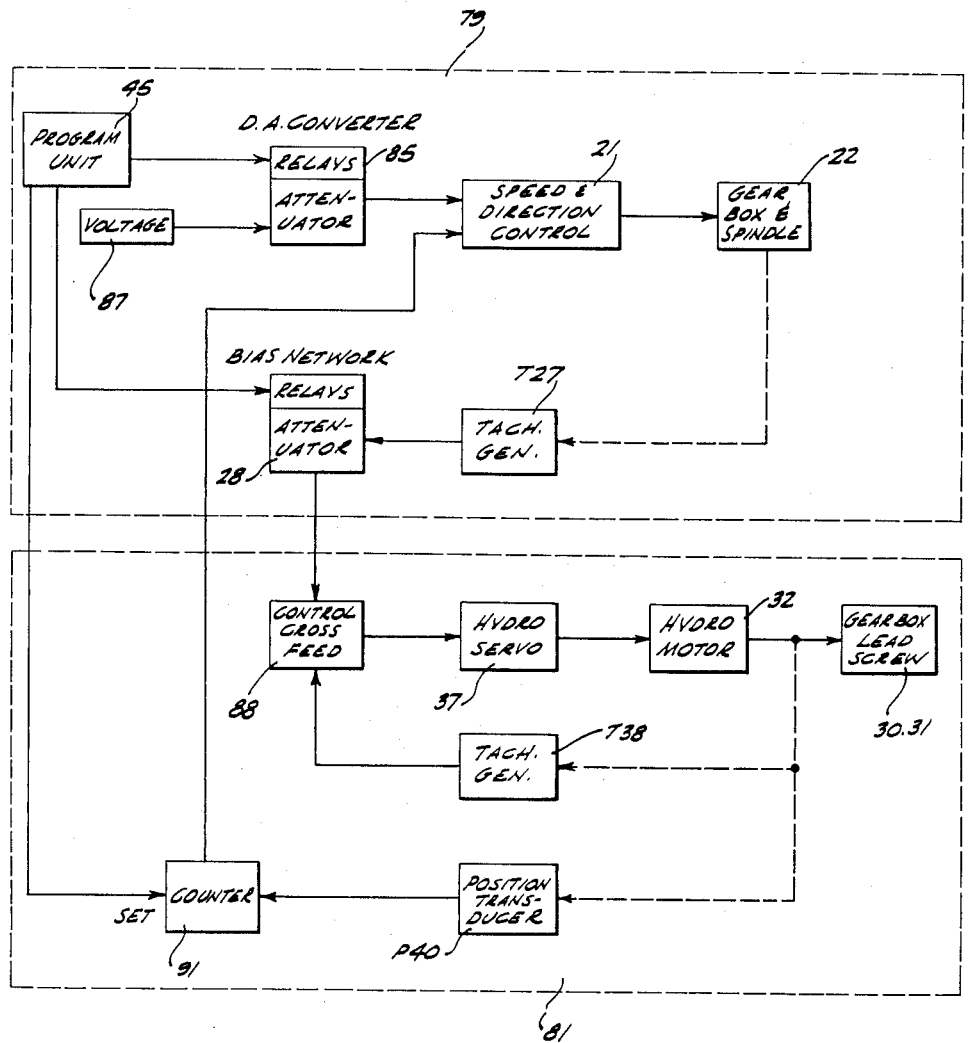
FIGURE 4 is a block diagram of the spindle rotation control system and the tool carriage assembly feed rate control system for a machine tool utilizing the present invention.

A general assembly of a machine tool embodying the principles of this invention is illustrated in FIGURE 1. The general arrangement illustrated herein involves a machine tool which is arranged about a common base. The common or main base is generally designated 10 and mounts a workpiece table 12 for rotation about a vertical axis for cross feed and for vertical movement. The base 10 is provided with a side face 13 receiving a tool base 14 about which is slidably mounted a spindle machine tool, generally designated 15.

The spindle machine tool comprises a tool carriage 17 which is suitably mounted and guided on ways 18 on the upper face of machine tool base 14. The geometry of this arrangement is such as to provide freedom for horizontal movement of the tool carriage 17 toward and away from the table 12. The spindle machine tool further comprises a housing 20. Mounted on the left end of this housing as viewed in FIGURE 1 is a conventional speed and direction control unit 21. This unit could typically be a Ward-Leonard speed control unit but is not specifically limited thereto. Briefly, a Ward-Leonard speed controller controls the speed and direction of rotation of a variable speed motor by interposing a conventional motor generator system between the variable speed motor and the power supply system. The two are so arranged that the excitation of the generator may be varied over a wide range by means of a rheostat or other variable impedance or variable voltage in its field circuit. The generator's armature and the motors' armature constitute a circuit by themselves which is not interrupted in series. By manipulations of the field rheostats and switch gear in the exciting circuits of the generator, and of the variable speed motor, the speed and direction of rotation of the variable motor are controlled.

Mounted on the right face of the housing as viewed in FIGURE 1 are the spindle housing 22, tool chuck 24, and a tool holder 23. A tool 25 is secured in the tool holder 23 and typically is a tapping or cutting tool. A tachometer generator T27 is mounted on the exterior surface of the spindle housing 22. A conventional tachometer generator T27 is positioned on the spindle housing 22 and connected to the tool spindle so that rotations of the tool 25 will generate voltages proportional to the rate of rotation of the spindle. While the tachometer generator T27 has been shown mounted externally of the spindle housing 22 it should be understood that this has been shown merely for an illustration and that its position may be changed to permit coupling anywhere in the spindle drive. The output of the generator T27 is applied as an input to a bias network, such as a digital to analogue converter, which will be described in more detail later.

A tool carriage assembly 17, as earlier pointed out, is mounted for sliding movement on ways 18. The tool carriage assembly 17 including the spindle assembly is powered by means of a lead screw 30 which is driven through a suitable gear train 31 by means of a hydraulic motor 32. A nut 34 is threaded over the lead screw 30 and is secured to a stand-off bracket 35 extending from the tool carriage assembly 17. Hence, rotation of the lead screw 30 effectively displaces the tool carriage 17 in a direction determined by the direction of rotation of the lead screw 30. A servo rate valve 37 controls the admission of hydraulic fluid to the hydraulic motor 32. This valve typically contains a valve spool (not shown), the position of which determines the flow rate and the direction of flow through the hydraulic motor. The actual control of the rate is achieved as will be described by applying a particular voltage to the rate valve control coils which is the difference between the input voltage representative of the spindle speed and a feedback voltage derived from a tachometer generator T38 which is driven at a speed proportional to the speed of rotation of the lead screw 30.

Since it is desired to measure the position of the tool carriage 17 along the ways from a home or retracted position, a position transducer generally designated P40 is coupled into the drive for the lead screw 30 and rotated thereby. The details of this transducer and scale counter circuits (referred to later) may be found by reference to application, Serial No. 80,485 by R. C. Bell, filed January 3, 1961, entitled "Condition Response Electrical System" and assigned to the assignee of this invention. Briefly, this transducer assembly and associated equipment under the control of a carriage operated limit switch LS41 begins counting lead screw revolutions at a precise point from the home or retracted position of the tool carriage indicated by the limit switch. Calibration is such that increments of displacement of 1 ml. or less are counted.

The control of the tool carriage movement includes a plurality of limit switches. Limit switch LS41 is employed with the scale counter circuits referred to in the copending application aforesaid to control the counting of the displacement increments. A limit switch LS42 may be a slowdown switch which is utilized in positioning circuits, for instance, in retracting the tool carriage, to drop the rate of retraction from transverse to creep speed. Limit switch LS44 is a stop switch and is utilized to restore the servo valve 37 to neutral position and cut off hydraulic fluid to the hydraulic motor 32.

Referring now to FIGURES 2 and 3 there is shown a typical digital to an analogue converter that may be used for the biasing network 28 of the present invention. It should be understood that this particular digital to analogue converter has been shown merely for illustrative purposes. The present invention is not limited specifically to this converter, since many other conventional converters may be substituted therefor within the scope of the invention.

The converter utilizes the input from a program unit 45 such as a tape reader or a manual push-button station to energize, in a programmed series, one or more of relay coils 1CR, 2CR, 3CR. To produce the desired attenuation of the voltage generated by the rotation of the spindle, a plurality of resistors are coupled in the output circuit of the tachometer generator by the operation of the relays. Each of the resistors has a specific value of resistance dependent upon a desired feed rate. For clarity of understanding of the present invention, as well as for continuity of description the digital to analogue converter will be described. Shown in FIGURE 2 is an arrangement of resistors and capacitors conventionally called a relay tree having resistors R1 through R8 and relays RL1, RL2, and RL3. While the relay tree has been shown as having three relays and eight resistors, it should be understood that the number of relays and resistor elements may be varied to produce any selected finite number of distinct conditions within the scope of the present invention. Each of the relays RL1, RL2, RL3 typically has two sets of contacts, such as normally closed contact 1CR1 and normally open contact 1CR2 for relay RL1. By programming the operation of the relay coils 1CR, 2CR, 3CR the corresponding relay contacts can be opened and closed in a predetermined sequence to place any one of the resistors R1 through R8 in a position to attenuate the voltage generated by the tachometer generator T27 with resistor R9. Thus, the voltage generated by the rotation of the tool spindle can be reduced to different discrete values each of which can be related to a desired feed rate of the tapping tool.

Referring now to FIGURE 4 there is shown a block diagram of the elements of the preesnt invention including the electrically interconnected spindle speed and feed rate systems 79, 81 respectively of a typical machine tool for tapping such as that in FIGURE 1.

Referring first to the spindle speed system there is shown a typical digital to analogue converter 85 comprising for simplicity a relay and an attenuator. A converter of the type described in a patent to S. Hansen, No. 2,718,- 634, may be used here or the relay tree network depicted in FIGURES 2 and 3 and previously described may be used. Typically, the relay portion of the converter receives discrete levels of voltage from a conventional program unit 45 and the attenuator portion receives voltage from a constant voltage source 87. Under predetermined rates of spindle speed of the machine tool the program unit 45 will actuate the relay portion of the converter, which in turn, causes an attenuation of the voltage supply to the attenuator thereby producing a voltage as a function of a desired programmed speed. This voltage is applied as an input to the Ward-Leonard speed controller 21 which, through suitable gearing, rotates the spindle. Mechanically coupled to the spindle, as described above, is the tachometer generator T27 which generates a voltage directly proportional to the speed of rotation of the spindle. This voltage is applied on an input to the bias network 28. As discussed above, the bias network typically comprises a conventional converter, such as a relay tree (see FIG. 2); however, for simplicity here it is depicted as comprising a relay portion and an attenuator portion. The relay portion receives a programmed input from the program unit 45 while the attenuator portion receives an input from the tachometer generator T27. As the relays are actuated, under the influence of the program unit 45, they control, through the operation of the attenuator portion, the output from the tachometer generator T27 as a function of the desired spindle speed as set by the program unit 45. The attenuated voltage is applied as an input to a suitable control unit 88 for the feed rate system 81. This control may be any conventional type of comparator circuit such as a bridge circuit which also receives an input from the output of a tachometer generator T38. When the inputs to the control unit 88 are unequal this circuit produces an electrical output controlling a hydraulic servo rate valve 37 the hydraulic output of which in turn controls a hydraulic motor 32. The hydraulic motor 32 is mechanically coupled through suitable gearing 31 to a lead screw 30 which is coupled to the tool carriage assembly 17. The hydraulic motor 32 as well is mechanically coupled to the tachometer generator T38 thereby displacing the tool carriage assembly 17 as well as driving the tachometer generator T38 at a speed proportional to the rate of movement of the assembly. System equilibrium occurs when the tachometer generator voltage is substantially equal to the voltage input as supplied through the bias network 28. A conventional binary count down counter is preset by the program unit. As discussed above a position transducer P40 senses increments of rotation of the lead screw 30 and produces output pulses which are coupled to count down the counter. At some predetermined minimum count including zero the counter 91 produces an electrical output which is applied as an input to the Ward-Leonard direction controller 21 to actuate a reversing switch (not shown) or other circuit device to change the direction of rotation of the spindle when the tool carriage assembly 17 has advanced to a desired position. Reversal of the spindle of course reverses the voltage which is applied to the attenuating network 28 by the tachometer generator T27. Consequently, the servo 37 controlling the feed of the spindle is reversed.

According to another method of control, a logical network, not shown, may be associated with the counter. This logical network may be partially set by the tape and enabled by the counter. Such a network may include suitable gates for each of the counter elements. In this arrangement an exact depth of tapping is not specified. The operator knows than the precise point at which the tapping operation is to terminate and programs typical dimensions such as one-half inch, one inch or two inches among others which may be selected on the tape. The counter under these circumstances will be counted down to zero at the point where tapping is to start. The operation of the tool with this scheme always starts in air and the spindle is advanced at the programmed rate. The logical network associated with the counter is set up so that it recognizes a particular counter configuration corresponding to one of the programmed dimensions, one-half inch, etc. In this circumstance, as the spindle is advanced the counter is counted up. At such time as it reaches the programmed dimension the counter configuration corresponds to that commanded by the tape and for which the logical gating is set. The signal produced by these gates is now instrumental to reverse the direction of rotation of the spindle which in turn reverses the servo 37 controlling the rate of feed. The counter is now counted down and movement of the tool carriage assembly 17 ceases or switches to rapid traverse at the time the counter is counted to zero or some other predetermined count below that which initially existed.

These and other arrangements for operating the counter may be utilized without departing from the principles of this invention.

From the above description it can be seen that the rate of advance of the tool carriage 17 is dependent upon the speed of the spindle as programmed by the program unit 45. In this fashion when the programmer 45 sets the speed of the spindle it in turn sets the amount of bias provided by the bias network 28 so that when the spindle rotates the tool carriage assembly 17 will advance only at a desired rate.

While but one embodiment of this invention has been herein illustrated, it will be appreciated by those skilled in the art that variations in the disclosed arrangement, both as to its details and as to the organization of such details may be made without departing from the spirit and scope hereof. Accordingly, it is intended that the foregoing disclosure and the showings made in the drawings shall be considered only as illustrative of the principles of this invention and not construed in a limiting sense.

I claim as my invention:

A machine tool, comprising:

a pair of relatively movable members;

an electric spindle drive means on one of said members;

a rotatable tool spindle mounted on said one member coacting with said spindle drive means for rotation thereby;

an electrical energy source means connected to said spindle drive means;

means included in said source means to program the electric energy to said spindle drive means in relation to a desired mode of operation of said machine tool;

voltage generating means coacting with said tool spindle for producing a voltage proportional to the speed of rotation of said spindle;

means included in said voltage generating means to bias said generated voltage as a function of the desired mode of operation of said machine tool;

power means connected to said biasing means and mounted on said one member for producing movement thereof as a function of the speed of rotation of said spindle;

means coacting with said one member to sense the position of said one member relative to the other member; and means included in said last mentioned means and connected to said spindle drive means to produce a voltage potential directly related to the relative position of said one member adapted to control the direction of rotation of said tool spindle.

References Cited by the Examiner

UNITED STATES PATENTS

| | | | |
|---|---|---|---|
| 2,330,993 | 10/43 | Perrine et al. | 318—286 |
| 2,401,164 | 5/46 | King et al. | 318—39 |
| 2,863,160 | 12/58 | Ovshinsky | 10—139 |
| 2,887,638 | 5/59 | Carl et al. | 318—39 |

ANDREW R. JUHASZ, *Primary Examiner.*